A. C. BROWNLICH.
Mowing Machine.
No. 2,583. Reissued April 30, 1867.
Fig. 1,
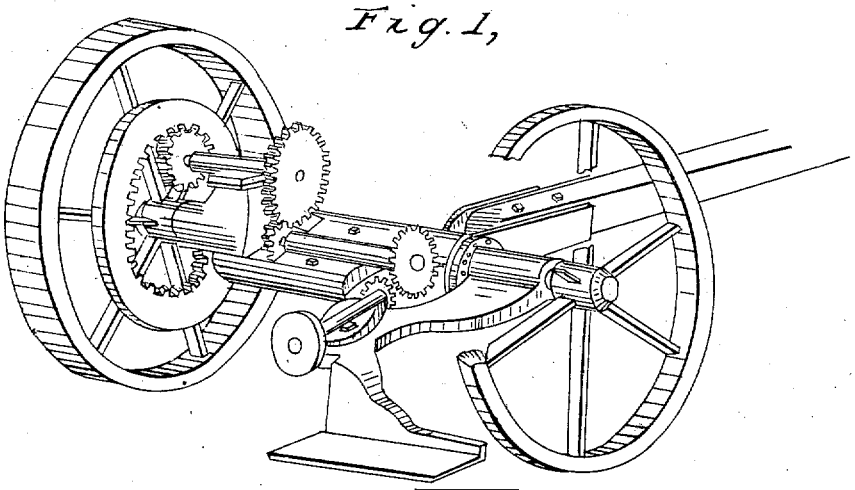
Fig. 2,
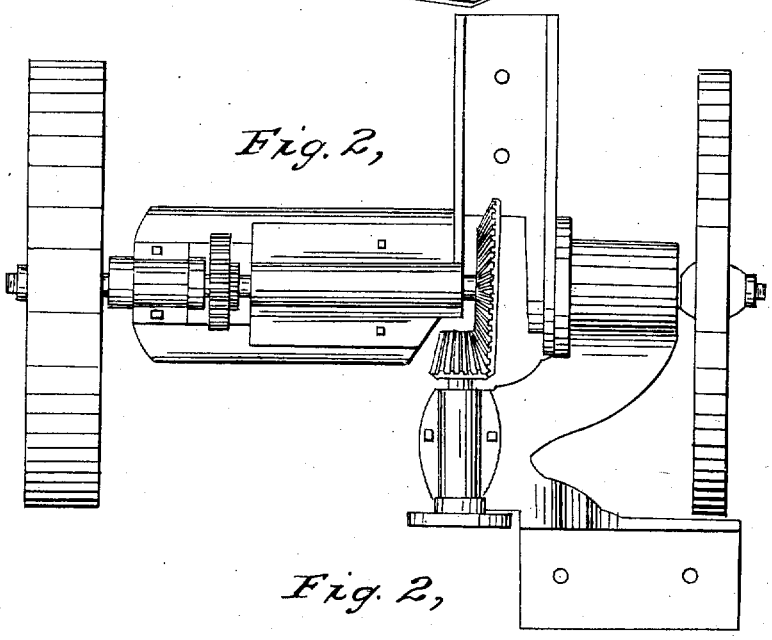
Fig. 2,
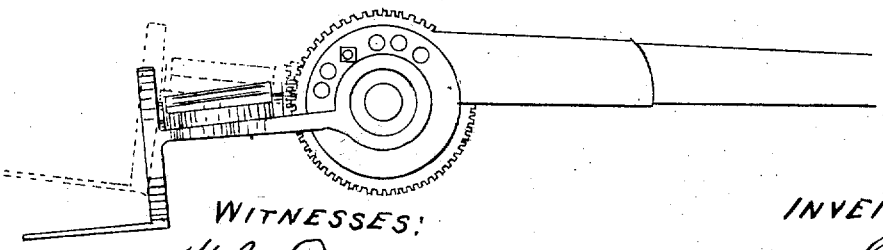
WITNESSES:
W C Doelg
R W Smith
INVENTOR:
C A Kuler Jr
N. PETERS, Photo-Lithographer, Washington, D. C.

United States Patent Office.

CYRENUS WHEELER, JR., OF POPLAR RIDGE, NEW YORK, ASSIGNEE BY MESNE ASSIGNMENTS OF A. C. BROWNLICH.

DIVISION B.

*Letters Patent No.* 22,483, *dated January* 4, 1859; *reissue No.* 2,583, *dated April* 30, 1867.

IMPROVEMENT IN HARVESTERS.

The Schedule referred to in these Letters Patent and making part of the same.

TO ALL WHOM IT MAY CONCERN:

Be it known that A. C. BROWNLICH, of Buffalo, in the State of New York, invented certain new and useful improvements in Harvesters; and I hereby declare that the following is a full and exact description thereof, reference being had to the accompanying drawings and the letters of reference marked thereon, in which—

Figure 1 is a perspective view of the machine.

Figure 2 is a plan or top view; and

Figure 3 is a side elevation showing by section the connection of the second frame—

Similar letters where they appear in the several figures indicating corresponding parts.

The invention consists in the employment of a vibrating frame carrying the cutting apparatus, arranged to vibrate about a centre coincident with the axis of rotation of a bevel-wheel which is mounted on an axis independent of the main drive-wheel axle, in combination with a means for locking or setting said vibrating frame at any desired angle of inclination to the ground.

It further consists in the employment in a two-wheel machine of a gear-block or frame, provided with a recess to receive the draught-pole constructed in one piece, as hereinafter explained.

To enable others skilled in the art to construct and use the invention, I will proceed to describe the same.

A is one of the supporting wheels, B is the other, which are so fitted as to revolve freely on axles C. With the supporting-wheel A is connected gear-wheel D so as to revolve with it. In suitable bearings F on the frame E is mounted a shaft-carrying pinion, G, gearing with gear-wheel D, the other end of the shaft carrying spur-wheel H gearing with pinion I. This pinion I is mounted on one end of a shaft, and is supported on the the frame E by suitable bearings J, the other end of the shaft carrying bevel-wheel K. This bevel-wheel K gears with pinion Q, imparting motion to it when in operation. L is a second frame, having a sleeve, M, for connecting it to the frame E by boss N, (see fig. 3,) on which it can freely turn. The centre of the boss N, the centre of the shaft on which the bevel-wheel K is mounted, and the centre of rotation of the two supporting-wheels A and B, and first gear-wheel D, are in line with or have their several axes of motion coincident. On the frame L is mounted a crank-shaft supported by suitable bearings O, to one end of which is fastened bevel-pinion Q, which gears with bevel-wheel K, to the outer end of which is fastened the crank-head P. The rear end of frame L has a shoe or flange, V, to which the cutting apparatus is bolted. The sleeve M has a collar, R, connected with it, having a series of holes, S, and corresponding flange T, on the frame E, has also a corresponding series of holes. By inserting a bolt, U, in these holes, the frame L can be restrained in its motions, and the cutting apparatus connected therewith sustained at any desired height from the ground. It will be seen that the frame E, or gear-block, has formed with it a recess, W, for the reception of the rear end of the draught-pole X, to which it is firmly fastened by bolts Y.

Having described its construction, its operation is as follows: The progressive movement of the machine over the ground imparts a rotary motion to the gear-wheel D, which in turn gives motion to pinion G and spur-wheel H, which in turn give motion to pinion I and bevel-wheel K, imparting to pinion Q on the crank-shaft the motion it receives from the other gearing. The frame L being free to oscillate on the boss N, rises and falls at its other end independent of the movements of the first frame, and is therefore, with the cutting apparatus connected with it, left free to follow the surface of the ground. By the arrangement of the two frames, as described, a short, compact machine is obtained, and a good length of crank-shaft is used, the machine well balanced, and the proper relation of the gearing preserved. One practical way of applying this branch of the invention having been described, it is deemed unnecessary to show how the improvement can be applied to other harvesters in use, as the ordinary skill of the constructor is sufficient for the purpose.

What I claim, and desire to secure by Letters Patent, is—

1. A vibrating frame carrying the cutting apparatus arranged to vibrate about a centre coincident with the axis of rotation of a bevel-wheel, which is mounted on an axis independent of the main drive-wheel axle, in combination with a means for locking or setting said vibrating frame at any desired angle of inclination to the ground.

2. In a two-wheel machine, a gear-block or frame for supporting the gearing, provided with a recess for the draught-pole constructed in one piece, substantially as described.

C. WHEELER, JR.

Witnesses:

S. J. BOWEN,

H. UNDERHILL.